Dec. 23, 1969  W. C. HOPKINSON ETAL  3,485,162
BEVERAGE PREPARATION AND DISPENSING APPARATUS
Filed April 1, 1968  2 Sheets-Sheet 1

INVENTORS:
William C. Hopkinson
Ralph R. Pecoraro
BY: James R. Hostson, Jr.
Philip T. Liggett
ATTORNEYS United States Patent Office 3,485,162
Patented Dec. 23, 1969

3,485,162
BEVERAGE PREPARATION AND
DISPENSING APPARATUS
William C. Hopkinson, Commack, and Ralph R. Pecoraro, Smithtown, N.Y., assignors to Universal Oil Products Company, Des Plaines, Ill., a corporation of Delaware
Filed Apr. 1, 1968, Ser. No. 717,809
Int. Cl. A47j 31/00
U.S. Cl. 99—283
7 Claims

ABSTRACT OF THE DISCLOSURE

A beverage producing and dispensing apparatus, for galley equipment, such as an automatic coffee maker machine, which provides pumping means to carry liquid to a removable and perforable container for holding coffee, and also provides for conducting a resulting beverage to a closed storage compartment from which such beverage may be drawn-off as desired. The pumping means and liquid flow into and through the beverage making substance is operated as part of an electric circuit means in a manner to be responsive to liquid contact with separate low and high level probes or electric terminals positioned inside of the beverage storage compartment of the apparatus.

---

This invention relates to an electrically operated automatic form of beverage producing and dispensing device for galley equipment. More particularly the invention is directed to a construction and arrangement suitable for making a hot beverage, such as coffee, from the use of perforable and replaceable canister type units, where liquid flow through such canister will be responsive to a liquid level in a beverage storage section.

There are, of course, many forms and types of automatically operating liquid dispensing devices; however, most of the devices are made to dispense one cup full of a hot or cold beverage or at least not more than about one carafe of the desired beverage. For example, a coffee making machine may utilize a packet of concentrate or small perforable can or container through which hot water will flow in a timed manner and in an amount to perhaps fill one carafe or pitcher with hot coffee. Stated another way, these devices seem to be limited by their various special constructions and arrangements to the production of only small quantities of a beverage and cannot be readily increased in size to provide for both the production and storage of a fairly large quantity of a special hot beverage, such as coffee. The use of timer means alone for the production of a large quantity of a beverage is not always accurate or dependable and must be relegated to a one batch production system. In other words, the use of timer means is not always of advantage where it is desired to effect the automatic "start and stop" production of a large stored quantity of a beverage from one or more producing canister means.

In connection with the present invention, it may be considered a principal object to provide automatic and electrically operated means to effect the controlled production and storage of coffee, or other beverage, into a suitable relatively large sized compartment from which such beverage may be withdrawn manually as desired.

A further object of the invention is to provide a special electrical circuit arrangement which includes pump means and switch means which will operate responsive to spaced electrical terminals positioned directly within the beverage storage zone.

Broadly, the present invention provides a beverage producing and dispensing apparatus adapted to maintain a storage compartment of made beverage, which comprises in combination, a source of liquid supply, a pumping means to place the liquid under pressure, canister holding means adapted to receive a perforable canister for retaining a beverage making substance, a liquid inlet means at one end of said holding means providing for piercing and introducing liquid into the clamped in place canister, conduit means to conduct the liquid supply under pressure from said pumping means to said liquid inlet means, and valve means in said conduit means to regulate flow to said inlet means and the canister, a liquid outlet means at an opposing end of said canister holding means providing for piercing such canister and discharging a resulting beverage, a beverage storage container with electrical grounding to the interior bottom portion thereof, a beverage transfer means between said liquid outlet means and said storage container, beverage discharge means from said storage container, and an electrical circuit means connective with said pumping means, said valve means and with said storage container, with such circuit means including a lower electrical terminal positioned to terminate within a lower internal portion of said beverage storage container, an upper terminal positioned to terminate in an upper interior portion of said storage compartment, and switching means providing electric circuit completion and circuit breakage as determined by a beverage liquid level contacting, in the first instance, upon the lower terminal being above and out of contact with liquid and, in the second instance, both of said terminals coming into contact with a liquid level.

A particular feature and advantage of the present beverage dispensing apparatus is directed to the fact that a larger quantity of beverage may be produced than has heretofore been possible in the conventional coffee making device or other similar machine. Particularly in connection with larger aircraft, it is now necessary that galley equipment be provided which will be self-operating and minimize the time of the stewardess in effecting the preparation of beverages for a large number of passengers. It is also necessary that the apparatus arrangements be readily cleaned and serviced as well as have desirable safety features to preclude mis-operation. In this instance a large quantity of coffee, or other similar hot beverage, may be produced and handled within a storage container where it is drawn off manually as may be desired by the attendant. In addition, a preferred design provides for utilizing a removable beverage storage tank which in turn will have a removable lid or wall portion such that the interior may be readily cleaned.

A particular and still further advantageous feature of the present invention relates to providing an electrical circuit and control means responsive to the level of the beverage in the container in a manner to minimize or eliminate openings into the container so as to in turn reduce steam and heat losses from such container. Thus, as a further embodiment of the invention, there is provided an electrical circuit arrangement for the beverage producing apparatus which utilizes a separate low voltage DC system, that can include liquid contacting to be used in combination with a higher voltage AC circuit that is connective with the pumping means. In other words, the lower voltage DC system provides a latching relay which will latch itself when energized and provide at least one switching operation to permit AC current flow to the pumping means, operate at least one solenoid valve to provide hot water flow through the system, and such DC system will also have a circuit with a first relay in a line connective with the upper terminal and a line from such relay to bypass the latching relay, whereby a high liquid level will effect a circuit completion and energizing of the relay to break the AC current flow to the pumping means, the electrical circuit will also have a second DC circuit with a second relay which is connective with the lower terminal of the circuit whereby there may be a temporary energizing of the latching relay and an initiation of the beverage producing operation, with the lower terminal being effective when contacting the liquid to retain the energizing of the second relay and preclude the need of further momentary or manual switching to initiate the energizing of the latching relay in the first said DC circuit. In fact the low level terminal, as long as it is covered with liquid, will preclude the making of additional beverage and the refilling of the container.

The electrical circuit means thus provides for the production of the beverage responsive to a low level of the liquid beverage in the storage container after having the operation started by an initial push-button operation. On the other hand, even though the container may be empty, following installation or cleaning or whatever, the beverage production will not be started until such time as there is a specific pushing of a starting switch to effect the energizing of a latching relay which will permit hot water flow and the commencement of a coffee brewing operation.

Reference to the accompanying drawings and the following description thereof will serve to better explain the novel construction features of the present apparatus as well as point out advantageous operational aspects as provided by the electrical circuit control means utilized in connection therewith.

Figure 1:
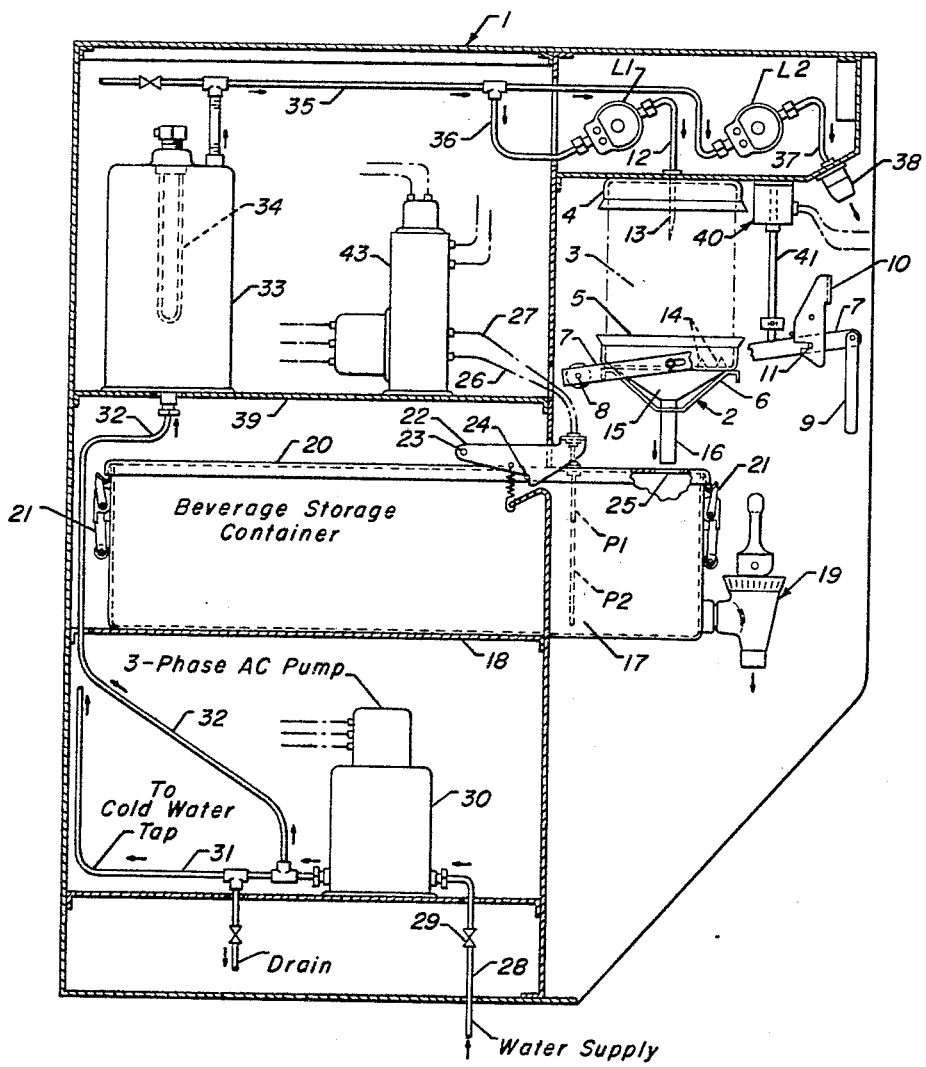
FIGURE 1 of the drawing indicates in a diagrammatic sectional elevational view one physical arrangement of the present automatic beverage brewing and dispensing apparatus.

Referring now particularly to FIGURE 1 of the drawing, there is indicated a supporting cabinet or structure 1 which is adapted to hold, in an open front portion, a suitable canister holding means 2. In the present embodiment, a perforable and removable canister 3 is held by an upper stationary cup section 4 and by a liftable lower cup and cone section 5, which in turn is raised and lowered by suitable frame means 6 connecting to lever arm means 7 pivoted at point 8. Such arm 7 is raised and lowered by gripping a suitable handle means 9. A latching means 10 to a pin 11 may be utilized to hold the removable canister 3 in place during the beverage making operation.

Preferably, such as in a coffee making operation, hot boiling water will be introduced by way of a line 12 and through a nozzle 13 into the interior of canister 3 and resulting hot coffee withdrawn through canister puncturing tips 14 into a cone section 15. From the latter coffee will pass downwardly into beverage transfer line 16 and then into the upper end of a beverage storage container 17.

The beverage storage container 17 is shown as being supported on a suitable intermediate support plate 18 within the central portion of the cabinet or frame 1 so as to have a front draw-off portion project outwardly to the front open portion of such cabinet. A suitable manually operated draw-off nozzle and spout means 19 is also shown at the front lower end portion of container 17. For cleaning purposes, the present embodiment indicates the use of a removable upper cover section 20 which may be held in place by suitable front and rear clamp means 21. In addition, a top clamping means 22 pivoting from a pin means 23 will bear against pin means 24 on top section 20 so as to hold the entire container 17 tightly within the cabinet 1 on the shelf means 18. In a simplified embodiment, hot beverage produced from canister 3 will descend from outlet 16 into an opening 25 in top cover 20, however, a tube or hose arrangement may be provided between the side or top portion of the container 17 and connect with the bottom of the cone section 15 below canister 3.

As a particular feature of the present invention, the interior of the storage container 17 is provided with a nonconducting Teflon liner, or other plastic type of material, except for a small internal strip or portion of the bottom so that electrical grounding will carry to an internal liquid. In addition, there will be two separate and vertically spaced apart electrical terminals or probes. One probe will terminate at a high level position and one at a low level position, as indicated in the drawing by the designations P1 and P2, respectively. In other words, P1 provides an electrical probe or contact terminal terminating at an upper level in the tank 17 and carrying through an insulated portion of the top cover 20 to a wire connecting means on the end of the latch 22 to in turn provide for an electrical conductive connection with line 26. Similarly, the low terminal or probe P2 carries up through insulated means to a separate terminal also carrying through the cover means 20 so as to in turn connect with the end of a wire or line 27. As will be explained more fully hereinafter in connection with the wiring diagram for the present embodiment, the probes P1 and P2 will be utilized to assist in the automatic safe control of the beverage producing operation of the unit.

At the lower end of the cabinet 1, there is provided a suitable water supply line 28, with valve means 29, which is shown carrying to electric pump 30. The latter is indicated as being a three phase 115 volt, alternating current, pump capable of providing a pressurized water system to insure carrying the water supply upwardly through lines 31 and 32 into a water heater or insulated boiler arrangement 33. The latter is in turn indicated as having an electrical immersion type heater coil 34 to maintain the production of high temperature water for making coffee or other suitable beverage. Although not shown in the drawing, the immersion heater means 34 will be provided with a suitable electric current source and thermostat control means to in turn provide hot water at a controlled high temperature suitable for coffee or other desired beverage. The heated water is indicated as leaving the boiler unit 33 by way of conduit 35 which carries to solenoid control valves L1 and L2. Solenoid L1 is indicated as being supplied with heated and pressurized water from a branch line 36 while the outlet therefrom joins with conduit 12 that carries into the piercing element 13 and canister unit 3. The outlet from solenoid L2 is indicated as connecting through connector means 37 to a hot water outlet nozzle 38.

The present diagrammatic embodiment indicates the solenoids L1 and L2 to be in the top portion of the cabinet 1, while the electrical panel and certain of the relay means of the electric circuitry, etc., may be supported on an upper shelf section 39 in cabinet 1; however, it is to be understood that the pipe lines, solenoids, pump means, electrical components, including relay means, etc., may be located in any conveniently desired manner. The principal circuitry for one embodiment of the invention, will be set forth hereinafter in connection with the description of FIGURE 2 of the drawing; however, with respect to supplying hot water through solenoid L2 and outlet nozzle 38, there may be suitable push-button means in a low voltage system to in turn effect the opening of such solenoid L2 as an attendant may desire. It is not deemed necessary, with regard to such conventional control means, to show a wiring arrangement for the operation of this portion of the overall unit. Actually, still other conventional features may be combined with the present apparatus but are not shown in the present drawings. For example, a cold water branch line may be provided from line 32 and directed to a third solenoid valve means and to a separate outlet nozzle means (not shown) as a convenience in having a cold water supply tap from the same combined unit.

As a safety feature in connection with the coffee producing and dispensing arrangement, which includes the use of the high and low level probe members P1 and P2 in storage container 17 in a special electrical system, there may be an initial safety switch such as switch means 40 to preclude any water flow to the beverage system unless a canister 3 is in place. Switch 40 has a depending movable switch arm 41 that contacts handle means 7 of the canister holding section 2. In other words, switch means 40 must be closed and rendered operative through the lifting of handle 9, arm 7 and the use of latch means 10 with a canister 3 in place, before the pump means 30 or solenoid means L1 will serve to carry water into canister 3.

Figure 2:
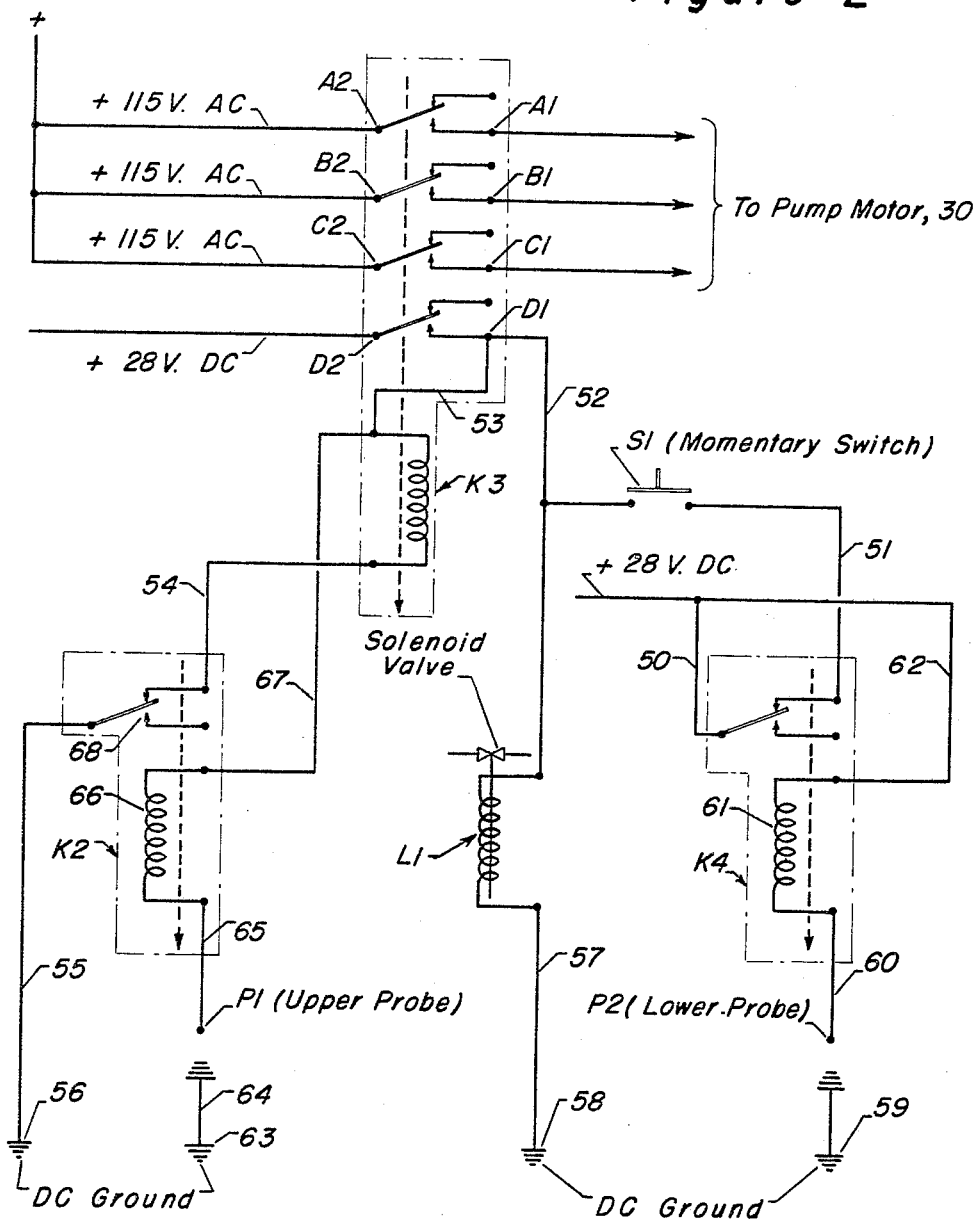
FIGURE 2 of the drawing indicates in a diagrammatic electrical drawing an embodiment of a portion of the circuitry relating to the control of fluid flow through the beverage producing section and into the beverage storage container.

Referring now particularly to FIGURE 2 of the drawing, there is indicated a 115/200 volt, alternating current, 400 cycle, 3-phase, electric power supply through relays at A2, B2 and C2 which in turn can serve to transfer current into lines A1, B1 and C1 responsive to the energizing of a relay means K3. In the present embodiment, the relay K3 is of the latching type so that once energized it will latch itself and hold the respective relays A2, B2, C2 and D2 into a closed contact position capable of transmitting current therethrough. The energizing of K3 is in turn indicated as being accomplished through a momentary switch button S1 in a 28 volt DC system. Current is carried through line 50 to a relay K4 and from the latter to line 51, switch S1 and lines 52 and 53 into the coil of K3. The latter is in turn indicated as being grounded through lines 54, relay means K2 and line 55 to a DC ground terminal at 56 so that such relay K3 will latch on to itself and close all relays A2, B2, C2 and D2. At the same time it will be noted that the 28 volt DC system carrying through switch S1 will energize the solenoid valve L1 by completion of the circuit through line 57 and ground terminal 58. The energizing of solenoid L1 (as may be noted in FIGURE 1 of the drawing) provides for the opening of the hot water flow from boiler means 33 into the piercing nozzle 13 for beverage producing canister 3.

Still further, in connection with the 28 volt DC system carrying through switch S1, there will be provided a means for breaking such circuit and the elimination of any effect of switch S1 in the circuit after there has been a completion of the grounding of probe P2 (i.e., liquid coverage of probe P2). In operation, where there is an energizing of a relay K4 from ground terminal 59 through line 60, coil 61 and line 62, then there is a resulting break in current flow from lines 50 and 51 to switch S1. This actually precludes beverage addition to the storage container until such time as it is substantially empty, or at least with a liquid level below probe P2.

As a still further feature of the safety oriented aspects of the present improved apparatus, another 28 volt DC system is shown in combination with relay means K2 and the upper probe P1. In other words, after the latching of relay K3 and upon the event of probe P1 becoming covered by liquid such that DC current carries from ground 63 through line 64 and probe P1 into line 65, coil 66, and line 67, there will be completion of a circuit through line 53 to the terminal at D1. This in turn results in the energizing of relay K2 so as to open the relay at 68 whereby latching relay K3 is released and precludes transfer of 115 volt supply to the pump means 30. Since P1 is the upper probe, or electrical terminal, as shown in FIGURE 1 of the drawing, there will be no further liquid or beverage introduced into the storage container 17 and in turn no possibility of overflowing such container.

Thus, in the operation of the present producing and dispensing apparatus, it will be noted that as long as coffee or other beverage is available for being withdrawn from nozzle 19 then the circuitry and the resulting brewing operations are such that there will be no coffee or beverage addition until time for a canister 3 change and an entire refill of container 17. When probe P2 has been brought out of contact with liquid level then there can be a restart and a resulting build-up of the beverage level in the storage container 17 to a point where there is contact with probe P1. Upon the latter contact, there will be a break in the energizing of the latching relay K3 (as shown in FIGURE 2) whereby the entire beverage producing operation will be halted until such time as the entire container 17 becomes substantially empty. As previously set forth, to again start the beverage producing operation and the refilling of the storage container 17 it is necessary to momentarily process the switch S1 so as to effect the latching of relay means K3 and a closing of the three phase 115 volt AC system for the pump means 30.

In order not to complicate FIGURE 1 of the drawing, there has been no attempt to indicate the location of the switch S1 and wiring within such FIGURE 1, however, the switch S1 may be positioned in any convenient location in the front of the cabinet where it is readily usable by the attendant. Still further, it is to be noted that there has been no attempt to show all of the various electrical lines and relay means comprising FIGURE 2 of the drawing; however, again, it should be noted that the relay means, electrical lines, grounds, etc., may be located in any convenient positions in the cabinet 1. Generally, the relay means may be concentrated in an electric circuit section 43, adjacent the solenoids L1 and L2, and above a support shelf means 39. Those skilled in the art with respect to electrical circuitry and the construction and operation of beverage dispensing devices will obviously be able to realize that modifications in structure and arrangement may be made without departing from the scope of the present invention. Further, it is not intended to limit the invention to the use of specific types of pumps, water heater means, thermostat circuits, relays, and the like, or to any one type of material in the construction of the cabinet, liquid holding sections, piping, etc. Normally, the beverage canister holding means, beverage transfer means and the storage tank means will be of stainless steel or of other temperature and corrosion resistant material which will have a smooth surface and be readily removable and cleanable. For some sections, suitably strong and temperature resistant plastics or fiber glass materials may also be utilized.

We claim as our invention:

1. A beverage producing and dispensing apparatus adapted to maintain a storage compartment of made beverage, which comprises in combination, a source of liquid supply, a pumping means to place the liquid under pressure, canister holding means adapted to receive a perforable canistor for retaining a beverage making substance, a liquid inlet means at one end of said holding means providing for piercing and introducing liquid into the held in place canister, conduit means to conduct the liquid supply under pressure from said pumping means to said liquid inlet means, and valve means in said conduit means to regulate flow to said inlet means and the canister, a liquid outlet means at an opposing end of said canister holding means providing for piercing such canister and discharging a resulting beverage, a beverage storage container with electrical ground means carrying from the exterior thereof to the interior of the bottom portion thereof, whereby an internally held liquid will be grounded, a beverage transfer means between said liquid outlet means and said storage container, beverage discharge means from said storage container, and an electrical circuit means connective with said pumping means, said valve means and with said storage container, with such circuit means including a lower electrical terminal positioned to terminate within a lower internal portion of said beverage storage container, an upper terminal positioned to terminate in an upper interior portion of said storage compartment, and switching means acting to permit electric circuit completion and circuit breakage as determined by a beverage liquid level in the first instance, upon the lower terminal being above and out of contact with liquid and, in the second instance, both of said terminals coming into contact with a liquid level.

2. The beverage producing and dispensing apparatus of claim 1 further characterized in that electrical heating means is provided within a suitable boiler section positioned downstream from said pumping means and upstream from the canister holding means, whereby a hot water supply is provided to the canister holding means for effecting the production of a hot beverage.

3. The beverage producing and dispensing apparatus of claim 1 further characterized in that said storage compartment comprises a removably positioned container means that is removably clamped into place in a position to have at least a portion thereof directly below the canister holding means of the apparatus for direct communication with said beverage transfer means.

4. The beverage producing and dispensing apparatus of claim 1 further characterized in that the portion of said circuit means connective with said lower and upper terminals is a DC system having a latching relay to latch itself when energized and provide at least one switching operation for AC current flow to said pumping means and a solenoid operation of said valve means, said DC system also having a first relay in a line connective with said upper terminal and a line from such relay to by-pass said latching relay whereby a high liquid level effecting a circuit completion and energizing of the latter relay will break the AC current flow to the pumping means, said circuit further having a second DC system with a manual switch and a second relay which is connective with said lower terminal, such switch and said second relay providing a manually controlled DC current flow through first said DC system to effect the energizing of said latching relay, while said lower terminal is effective, when contacted, to retain the energizing of said second relay and preclude the need of said manual switch to initiate the operation of said latching relay in first said DC system.

5. The beverage producing and dispensing apparatus of claim 1 further characterized in that a separate switch means connects with said canister holding means in a manner to provide a switch closing responsive to the latching of a canister within said holding means and such switch closing providing for the initial closing of said electrical circuit means connective with said pumping means.

6. The beverage producing and dispensing apparatus of claim 1 further characterized in that a removable latching means is provided to hold a beverage storage container in place within said apparatus and said latching means provides contact terminals to be in alignment with upper terminal portions above the top of such container for respectively the upper and lower internal terminal means of the storage container whereby wiring means directly connected to such container will be precluded.

7. The beverage producing and dispensing apparatus of claim 1 further characterized in that said storage container has at least a metal bottom portion and is lined with an electrically nonconductive plastic type material except for a portion of the bottom section thereof to permit electric grounding of a liquid in said container.

References Cited

UNITED STATES PATENTS

| | | | |
|---|---|---|---|
| 2,464,862 | 3/1949 | Herrera | 99—302 |
| 2,996,975 | 8/1961 | Fry | 99—302 |
| 3,334,571 | 8/1967 | Matty | 99—307 X |
| 3,403,617 | 10/1968 | Lampe | 99—295 |

ROBERT W. JENKINS, Primary Examiner

U.S. Cl. X.R.

99—302